(12) United States Patent
Holliday

(10) Patent No.: US 7,914,278 B2
(45) Date of Patent: Mar. 29, 2011

(54) INTERNALLY HEATED NOZZLE ADAPTER

(75) Inventor: Christopher D. Holliday, Newton Falls, OH (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 12/389,659

(22) Filed: Feb. 20, 2009

(65) Prior Publication Data

US 2009/0214693 A1      Aug. 27, 2009

Related U.S. Application Data

(60) Provisional application No. 61/066,691, filed on Feb. 22, 2008.

(51) Int. Cl.
*B29C 45/20* (2006.01)

(52) U.S. Cl. .................................. 425/549; 264/328.15

(58) Field of Classification Search .................. 425/549; 264/328.15

See application file for complete search history.

(56) References Cited

U.S. PATENT DOCUMENTS

| | | | | |
|---|---|---|---|---|
| 4,892,474 A * | 1/1990 | Gellert | .......................... | 425/549 |
| 5,820,900 A * | 10/1998 | McGrevy | ....................... | 425/549 |
| 6,163,016 A * | 12/2000 | Johnson et al. | ............... | 219/424 |
| 6,619,948 B2 * | 9/2003 | Gunther | ........................ | 425/549 |
| 7,118,704 B2 * | 10/2006 | Olaru | ........................ | 264/328.15 |
| 7,131,833 B2 * | 11/2006 | Babin | ............................ | 425/549 |

* cited by examiner

*Primary Examiner* — Tim Heitbrink
(74) *Attorney, Agent, or Firm* — Mark Svoboda

(57) ABSTRACT

A nozzle adapter for an injection molding machine includes a body and one or more retainers mountable to an outer surface of the body. When the body and a retainer are assembled together they cooperate to define a cavity adapted to contain a cartridge heater between the body and the retainer. Access to allow replacement of the cartridge heater can be gained by removing the retainer from the body without removing the entire nozzle adapter from the injection molding machine.

7 Claims, 2 Drawing Sheets

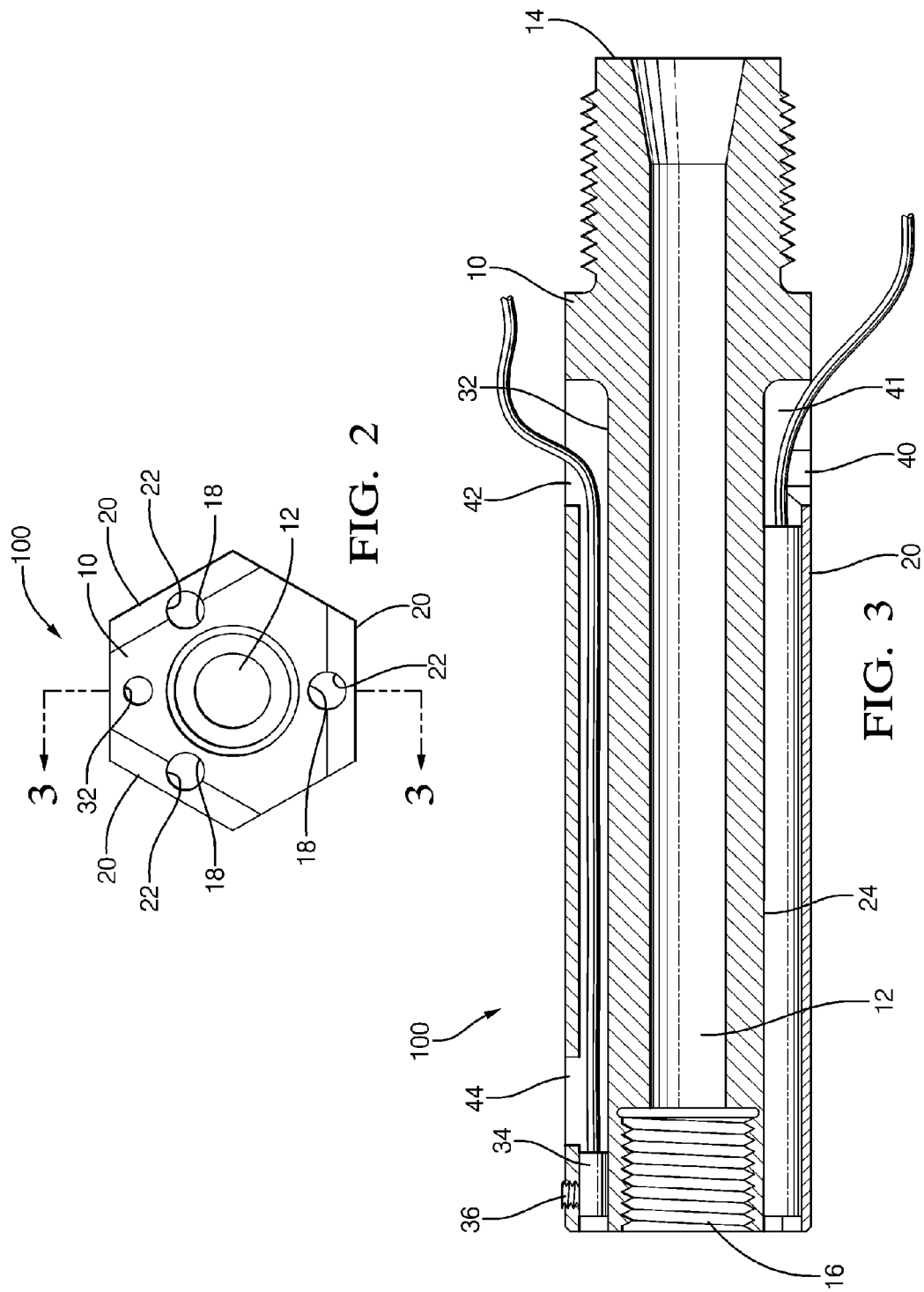

INTERNALLY HEATED NOZZLE ADAPTER

CROSS-REFERENCE TO RELATED APPLICATIONS

This application claims the benefit of U.S. Provisional Application No. 61/066,691, filed Feb. 22, 2008, which is incorporated by reference.

TECHNICAL FIELD OF INVENTION

This invention relates to injection molding machines, and in particular to nozzle adapters for injection molding machines.

BACKGROUND OF THE INVENTION

Injection molding is a process in which a molding machine forces melted plastic through a nozzle into a mold cavity where it is held until it solidifies, resulting in a solid part that assumes the shape defined by the cavity. Before injection into the mold, the plastic must be heated to a temperature which allows it to flow under pressure. Molding machines may use a nozzle adapter that defines a melt passage to convey molten plastic from the machine through the nozzle to the mold. It is important to keep the molten material at the proper temperature to optimize the flow of the material into the mold. To achieve and maintain the proper temperature of the material injected into the mold, one or more heaters may be used to heat the nozzle adapter. Currently available nozzle adapters often contain one or more electrically powered cartridge heaters located parallel to the melt passage. In such conventional configurations a cartridge heater is commonly inserted into a circular hole accessed through an end of the nozzle adapter.

For best heater efficiency it is desirable for the outside diameter of the heater to closely match the diameter of the hole into which the heater is inserted. For this reason, it is common to ream the hole to achieve close dimensional tolerances. The conventional method of inserting the heater into a hole requires that the hole diameter be large enough to accommodate a slip fit, which may result in reduced heater efficiency. In the event a heater needs to be replaced, material galling or sticking may make it difficult to extract a heater from a tight cylindrical passageway. It may be necessary to drill out a defective heater from a nozzle adapter, resulting in the potential of damaging the nozzle adapter. For example, the process of drilling out a cartridge heater may result in enlargement of the hole, so that heat transfer between the nozzle adapter and the replacement heater is degraded.

In the conventional configuration described above it is necessary to be able to access the nozzle adapter from its end in order to replace a heater. In a typical injection molding machine, accessibility of the ends of a nozzle adapter requires complete removal of the nozzle adapter from the molding machine. This process is time consuming and may lead to extended machine downtime.

There is a need for an apparatus to contain cartridge heaters in a nozzle adapter that facilitates simplified, more convenient, and reliable replacement of one or more heaters with reduced machine downtime and reduced risk of damaging other components.

BRIEF SUMMARY OF THE INVENTION

In an exemplary embodiment of the invention, a nozzle adapter for an injection molding machine includes a body and one or more retainers mountable to an outer surface of the body. When the body and a retainer are assembled together they define a cavity adapted to contain a cartridge heater between the body and the retainer. Access to allow replacement of the cartridge heater can be gained by removing the retainer from the body without removing the entire nozzle adapter from the injection molding machine. Additionally, a cartridge heater can be replaced by accessing the nozzle adapter from a side, which typically offers an advantage over requiring access to an end of the nozzle adapter.

BRIEF DESCRIPTION OF THE SEVERAL VIEWS OF THE DRAWINGS

FIG. 2 is an end view of an internally heated nozzle adapter according to an exemplary embodiment of the invention.

FIG. 3 is a cross-sectional view, taken through FIG. 2, of an internally heated nozzle adapter according to an exemplary embodiment of the invention.

DETAILED DESCRIPTION OF INVENTION

Figure 1:
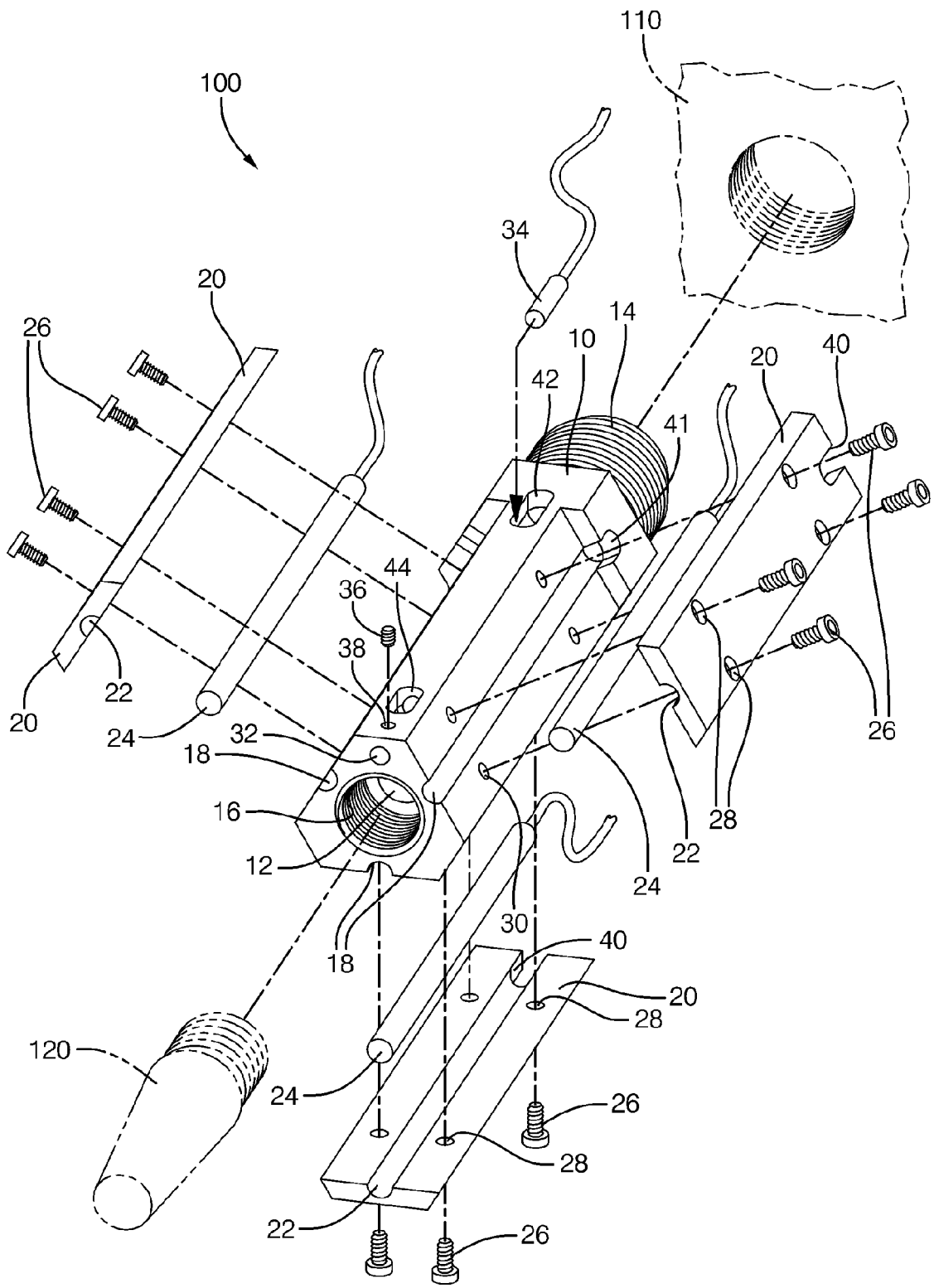
FIG. 1 is an exploded view of an internally heated nozzle adapter according to an exemplary embodiment of the invention.

In accordance with an exemplary embodiment of the invention, FIG. 1 shows an exploded view of an internally heated nozzle adapter 100. The nozzle adapter 100 has a first end 14 adapted to mount to a molding machine 110, and a second end 16 adapted to mount to a nozzle 120 that interfaces with a mold (not shown). In the embodiment shown in FIG. 1, the nozzle adapter 100 comprises a body 10, which defines a melt passage 12 extending from the first end 14 to the second end 16. When the nozzle adapter 100 is in use, the melt passage 12 is adapted to convey melted plastic from the molding machine 110 to the nozzle 120.

In the embodiment shown in FIG. 1, the body defines a plurality of grooves on the outside surface, wherein each groove 18 is adapted to receive a cartridge heater 24. The embodiment in FIG. 1 contains three such grooves 18, to accommodate three cartridge heaters 24. The body 10 is preferably made of metal.

FIG. 1 also shows a set of heater retainers 20. Each retainer 20 has a groove 22 that, when mounted to the nozzle adapter body 10, cooperates with the groove 18 in the nozzle adapter body 10 to define a cavity that can retain a cartridge heater 24. In the embodiment shown, the grooves 18 in the body 10 and the grooves 22 in the retainer 20 are each semicircular in cross section, and each body groove 18 is disposed so that when a retainer 20 is assembled to the body 10, a body groove 18 is aligned with a retainer groove 22 to receive a cylindrical heater 24. Three retainers 20 are shown, corresponding to the three grooves in the body 10 shown in FIG. 1. A retainer 20 can be made of metal or of an insulating material.

In the embodiment presented in FIG. 1 the nozzle adapter body 10 and the retainer 20 are adapted to be fastened together by at least one screw 26 passing through a clearance hole 28 in the retainer 20 and engaging a tapped hole 30 in the body 10. The retainer 20 could alternatively be attached to the body 10 by other fastening means, including but not limited to pins, studs, band clamps, toggle clamps, and other suitable means known in the art.

FIG. 1 also shows open regions 40 defined in the retainers 20 and open regions 41 defined in the body 10. These open regions 40, 41 cooperate to define an opening that allows the wire leads of cartridge heaters 24 to exit the nozzle adapter 100, for connection to appropriate heater control equipment. In alternative embodiments, the openings to accommodate the leads associated with cartridge heater could be defined wholly by body 10, wholly by retainer 20, or by both body 10 and retainer 20 as depicted in FIGS. 1 and 3.

Referring again to FIG. 1, the nozzle adapter body 10 can also define a passage 32 to receive a thermocouple 34 to monitor the temperature of the nozzle adapter 100. In the embodiment shown, the body 10 also defines two openings 42 and 44 that extend from the exterior of body 10 to thermocouple passage 32. Thermocouple 34 can be installed in body 10 by inserting the thermocouple 34 through opening 42. The thermocouple 34 can then be pushed through passage 32 until it reaches opening 44. Opening 44 provides visual and physical access to the thermocouple 34, allowing it to be positioned so that it can be captured by set screw 36 installed in hole 38. Opening 42 allows the thermocouple wires to exit the nozzle adapter for connection to appropriate temperature measurement and control equipment.

FIG. 2 shows an end view of an assembled nozzle adapter 100, as seen from second end 16 of body 10, according to an exemplary embodiment of the invention. In this embodiment, the nozzle adapter 100 is shown to have a cross section corresponding to a regular hexagon. This facilitates installation of the nozzle adapter 100 to the molding machine 110 shown in FIG. 1, as well as installation of the nozzle 120 shown in FIG. 1 to the nozzle adapter 100, using standard tools such as wrenches. The view in FIG. 2 also clearly shows the grooves 18 in body 10 cooperating with the grooves 22 in retainer 20 to define a cavity adapted to receive cylindrical cartridge heaters 24. In the embodiment shown, thermocouple passage 32 is formed by drilling into body 10 from second end 16 in a direction toward first end 14.

FIG. 3 is a cross section of nozzle adapter 100 in the direction indicated in FIG. 2. FIG. 3 shows more clearly melt passage 12 extending through body 10 from the first end 14 to the second end 16. FIG. 3 also more clearly shows thermocouple 34 installed in passage 32 and captured by set screw 36. Opening 44 extends from the surface of body 10 to passage 32, and is operable to provide access to assist in verifying the presence and location of thermocouple 34, as well as access to allow urging thermocouple 34 to the desired location. The wire leads associated with thermocouple 34 exit the nozzle adapter 100 through opening 42, which extends from the surface of body 10 to passage 32.

FIG. 3 also shows a cartridge heater 24 installed in the cavity defined by the cooperation of groove 18 in body 10 and groove 22 in retainer 20. The wire leads associated with cartridge heater 24 exit the nozzle adapter 100 through an open region defined by the cooperation of opening 40 defined in retainer 20 and opening 41 defined in body 10. In alternative embodiments, the opening to accommodate the leads associated with cartridge heater could be defined wholly by body 10, wholly by retainer 20, or by both body 10 and retainer 20 as depicted in FIGS. 1 and 3.

Access to a defective heater for the purpose of repairing or replacing the heater can be gained by removing the corresponding retainer. Removal and replacement of component parts from the heated nozzle adapter can be accomplished by access in an essentially radial direction. This may allow repair or replacement of a heater to be accomplished without removing the nozzle adapter from the molding machine. With the retainer removed from the body, a heater is easily removed, compared to removing a heater axially from a tight cylindrical passageway. Heater replacement can be accomplished with reduced effort, reduced machine downtime, and decreased chances of damage to the nozzle adapter compared to conventional heated nozzle adapters in which heaters are installed in and removed axially from a cylindrical passageway.

While this invention has been described in terms of exemplary embodiments thereof, it is not intended to be so limited, but rather only to the extent set forth in the claims that follow.

I claim:

1. A nozzle adapter for an injection molding machine comprising:
    a body;
    a retainer mountable to an outer surface of the body; and
    a fastener for attaching the retainer to the body;
    said body and retainer together defining a cavity adapted to contain a generally cylindrical rod-shaped cartridge heater, said cavity positioned between said body and said retainer;
    wherein said body has a longitudinal axis, said body further defining a melt passage disposed axially along said longitudinal axis
    wherein the retainer and the fastener are removable from the body, wherein removal can be performed by moving the retainer and the fastener in an essentially radial direction relative to the longitudinal axis of the body.

2. The nozzle adapter according to claim 1, wherein the body has a first end adapted for attachment to the injection molding machine and a second end adapted for attachment to a molding nozzle.

3. The nozzle adapter according to claim 1 additionally comprising a generally cylindrical rod-shaped cartridge heater, wherein at least one of the body or the retainer defines a concavity disposed such that the cavity defined by the body and retainer together circumferentially surrounds the cartridge heater.

4. The nozzle adapter according to claim 1, wherein at least one of the body or the retainer defines an open region adapted to convey wires from the cartridge heater to the exterior of the nozzle adapter.

5. The nozzle adapter according to claim 1 additionally comprising a thermocouple, wherein the body additionally defines a thermocouple passage adapted to contain the thermocouple.

6. The nozzle adapter according to claim 5, wherein the body defines an open region adapted to convey wires from the thermocouple to the exterior of the nozzle adapter.

7. The nozzle adapter according to claim 6, wherein the body additionally defines an opening from the thermocouple passage to the exterior of the nozzle adapter, said opening being disposed remote from the open region adapted to convey wires from the thermocouple, said opening further being disposed so as to allow direct access to the thermocouple passage from the exterior of the nozzle adapter.

* * * * *